United States Patent
Sato et al.

(10) Patent No.: US 10,519,829 B2
(45) Date of Patent: Dec. 31, 2019

(54) EXHAUST PURIFICATION SYSTEM

(71) Applicant: HINO MOTORS, LTD., Hino-shi, Tokyo (JP)

(72) Inventors: Shinya Sato, Hino (JP); Mitsuru Hosoya, Hino (JP); Takashi Takakura, Hino (JP)

(73) Assignee: HINO MOTORS, LTD., Hino-shi, Tokyo (JP)

( * ) Notice: Subject to any disclaimer, the term of this patent is extended or adjusted under 35 U.S.C. 154(b) by 0 days.

(21) Appl. No.: 16/078,465

(22) PCT Filed: Feb. 22, 2016

(86) PCT No.: PCT/JP2016/055052
§ 371 (c)(1),
(2) Date: Aug. 21, 2018

(87) PCT Pub. No.: WO2017/145235
PCT Pub. Date: Aug. 31, 2017

(65) Prior Publication Data
US 2019/0024555 A1    Jan. 24, 2019

(51) Int. Cl.
*F01N 3/08*    (2006.01)
*B01D 3/00*    (2006.01)

(52) U.S. Cl.
CPC .......... *F01N 3/0842* (2013.01); *B01D 3/008* (2013.01); *B01D 2257/404* (2013.01);
(Continued)

(58) Field of Classification Search
None
See application file for complete search history.

(56) References Cited

U.S. PATENT DOCUMENTS 6,382,600 B1    5/2002   Mahr
2004/0115110 A1*  6/2004   Ripper ................. B01D 53/90
                                              423/235

(Continued)

FOREIGN PATENT DOCUMENTS

EP    2628913 A1    8/2013
EP    2386735 B1    9/2015
(Continued)

OTHER PUBLICATIONS

Hiroaka et al. (JP2012-082804A)—translated document (Year: 2012).*
(Continued)

*Primary Examiner* — Walter D. Griffin
*Assistant Examiner* — Jelitza M Perez
(74) *Attorney, Agent, or Firm* — Kilpatrick Townsend & Stockton LLP

(57) ABSTRACT

An exhaust purification system includes an exhaust passage. Exhaust gas flows through the exhaust passage. A burner is arranged in the exhaust passage. A combustion space for fuel in the burner is a part inside the exhaust passage. A NOx adsorbent is located downstream of the combustion space in the exhaust passage. The NOx adsorbent adsorbs nitrogen oxide contained in the exhaust gas. A selective reduction catalyst is located downstream of the NOx adsorbent in the exhaust passage. An adding valve is located between the selective reduction catalyst and the combustion space in the exhaust passage. A connection passage is connected to the adding valve. Urea water flows through the connection passage toward the adding valve. A part of the connection passage runs through the combustion space.

6 Claims, 4 Drawing Sheets

(52) U.S. Cl.
CPC .. *B01D 2258/01* (2013.01); *B01D 2259/4566* (2013.01); *F01N 2570/14* (2013.01); *F01N 2610/01* (2013.01)

(56) References Cited

U.S. PATENT DOCUMENTS

| | | |
|---|---|---|
| 2010/0269492 A1 | 10/2010 | Kotrba et al. |
| 2011/0283685 A1* | 11/2011 | Kotrba ................ F01N 3/0821 60/286 |
| 2011/0289906 A1 | 12/2011 | Morley et al. |

FOREIGN PATENT DOCUMENTS

| | | | | |
|---|---|---|---|---|
| JP | H0913932 A | 9/2001 | | |
| JP | 2002-531743 A | 9/2002 | | |
| JP | 2005-507985 A | 3/2005 | | |
| JP | 2009013932 A | 1/2009 | | |
| JP | 2012-82804 A | 4/2012 | | |
| JP | 2012082804 A * | 4/2012 | ........... | F01N 3/2033 |
| JP | 2012082804 A * | 4/2012 | ........... | F01N 3/2033 |
| JP | 2013-11193 A | 1/2013 | | |
| JP | 2014-527592 A | 10/2014 | | |
| WO | 2010/079619 A1 | 7/2010 | | |
| WO | 2017/145235 A1 | 8/2017 | | |

OTHER PUBLICATIONS

Hiraoka et al. JP2012082804A—translated document (Year: 2012).*
International Search Report for PCT/JP2016/055052 dated May 31, 2016, 2 pages.
International Preliminary Report on Patentability for PCT/JP2016/055052 dated Aug. 28, 2018, all pages.

* cited by examiner

EXHAUST PURIFICATION SYSTEM

TECHNICAL FIELD

The present invention relates to an exhaust purification system including a selective reduction catalyst.

BACKGROUND ART

A known exhaust purification system that reduces nitrogen oxide (hereinafter referred to as "NOx") contained in exhaust, such as that described in patent document 1, includes a urea selective catalytic reduction (SCR) system using a urea water adding device and a selective reduction catalyst. In the urea SCR system, exhaust gas to which urea water has been added by the urea water adding device flows into the selective reduction catalyst, and the urea water is converted into ammonia through hydrolysis. In the selective reduction catalyst, NOx is reduced by the ammonia and converted into nitrogen and water.

PRIOR ART DOCUMENT

Patent Document

Patent Document 1: Japanese Laid-Open Patent Publication No. 2013-11193

SUMMARY OF THE INVENTION

Problems that are to be Solved by the Invention

The urea water added to the exhaust gas is hydrolyzed by heat of the exhaust gas or heat of the selective reduction catalyst and converted into ammonia. Thus, when the temperature of the exhaust gas or the temperature of the selective reduction catalyst is low, the urea water is not easily converted into ammonia. Further, the urea contained in the urea water is crystallized. Accordingly, the addition amount of urea water has to be limited. Such a limit of urea water will decrease the reduction amount of NOx.

It is an object of the present invention to provide an exhaust purification system that increases the reduction amount of NOx.

Means for Solving the Problem

An exhaust purification system that solves the above problem includes an exhaust passage, a burner, a NOx adsorbent, a selective reduction catalyst, an adding valve, and a connection passage. Exhaust gas flows through the exhaust passage. The burner is arranged in the exhaust passage. A combustion space for fuel in the burner is a part inside the exhaust passage. The NOx adsorbent is located downstream of the combustion space in the exhaust passage. The NOx adsorbent adsorbs nitrogen oxide contained in the exhaust gas. The selective reduction catalyst is located downstream of the NOx adsorbent in the exhaust passage. The adding valve is located between the selective reduction catalyst and the combustion space in the exhaust passage. The connection passage is connected to the adding valve. Urea water flows through the connection passage toward the adding valve. A part of the connection passage runs through the combustion space.

With the above structure, even when the catalyst temperature is lower than the activation temperature, urea water and hydrolyzed ammonia heated in the combustion space by operating the burner can be supplied to exhaust gas. As a result, the reduction amount of NOx increases. Further, even when the catalyst temperature of the selective reduction catalyst is lower than the activation temperature, NOx can be adsorbed by the NOx adsorbent located upstream of the selective reduction catalyst. This prevents NOx from being emitted into the atmosphere even during cold start or low-load operation at a temperature that is lower than the activation temperature at which the selective reduction catalyst is activated.

The above exhaust purification system may further include a diesel particulate filter (DPF) located between the burner and the NOx adsorbent in the exhaust passage.

With the above structure, the DPF is used to capture particulate matter generated through combustion of fuel in the engine.

Further, in the above exhaust purification system, the selective reduction catalyst is a downstream selective reduction catalyst, the adding valve is a downstream adding valve, and the connection passage is a connection passage for the downstream adding valve. An upstream selective reduction catalyst may be integrated with the DPF. The upstream selective reduction catalyst is located upstream of the downstream selective reduction catalyst in the exhaust passage. In this case, the exhaust purification system further includes an upstream adding valve located upstream of the upstream selective reduction catalyst in the exhaust passage and a connection passage for the upstream adding valve connected to the upstream adding valve. Urea water flows through the connection passage toward the upstream adding valve. A part of the upstream connection passage runs through the combustion space.

With the above structure, NOx is reduced at the upstream side of the NOx adsorbent and the downstream selective reduction catalyst, and the burden on the NOx adsorbent and the downstream selective reduction catalyst is reduced. The upstream selective reduction catalyst is arranged integrally with an upstream surface of the DPF, and the NOx adsorbent is arranged integrally with a downstream surface of the DPF. This simplifies the structure and reduces the number of components.

In the exhaust purification system, the exhaust passage may include a combustion space defining wall, which defines the combustion space. The combustion space defining wall may separate a space where the selective reduction catalyst is located and the combustion space from each other. The fuel may be burned by the burner so that the selective reduction catalyst is heated via the combustion space defining wall.

With the above structure, when the burner is operated to heat urea water, the selective reduction catalyst is heated via the combustion space defining wall. This shortens the time for the catalyst temperature of the selective reduction catalyst to reach the activation temperature.

The exhaust purification system may further include a control device that obtains a catalyst temperature of the selective reduction catalyst and operates the burner when the obtained catalyst temperature is lower than an activation temperature of the selective reduction catalyst.

The above structure minimizes the consumption of fuel required to heat urea water with the burner.

Further, in the exhaust purification system, the burner is an upstream burner located upstream of the NOx adsorbent in the exhaust passage. In addition, the exhaust purification system may further include a downstream burner located between the NOx adsorbent and the selective reduction catalyst in the exhaust passage. In this case, the control device operates the downstream burner when the obtained catalyst temperature is lower than the activation temperature of the selective reduction catalyst.

With the above structure, the downstream burner is operated when the catalyst temperature of the downstream selective reduction catalyst is lower than the activation temperature. This heats the selective reduction catalyst and heats urea water supplied to the selective reduction catalyst to convert the urea water into ammonia through hydrolysis. This further shortens the time for the catalyst temperature of the downstream selective reduction catalyst to reach the activation temperature.

EMBODIMENTS OF THE INVENTION

An exhaust purification system according to one embodiment will now be described with reference to FIGS. 1 to 6.
[First Embodiment]

Figures 1, 2:
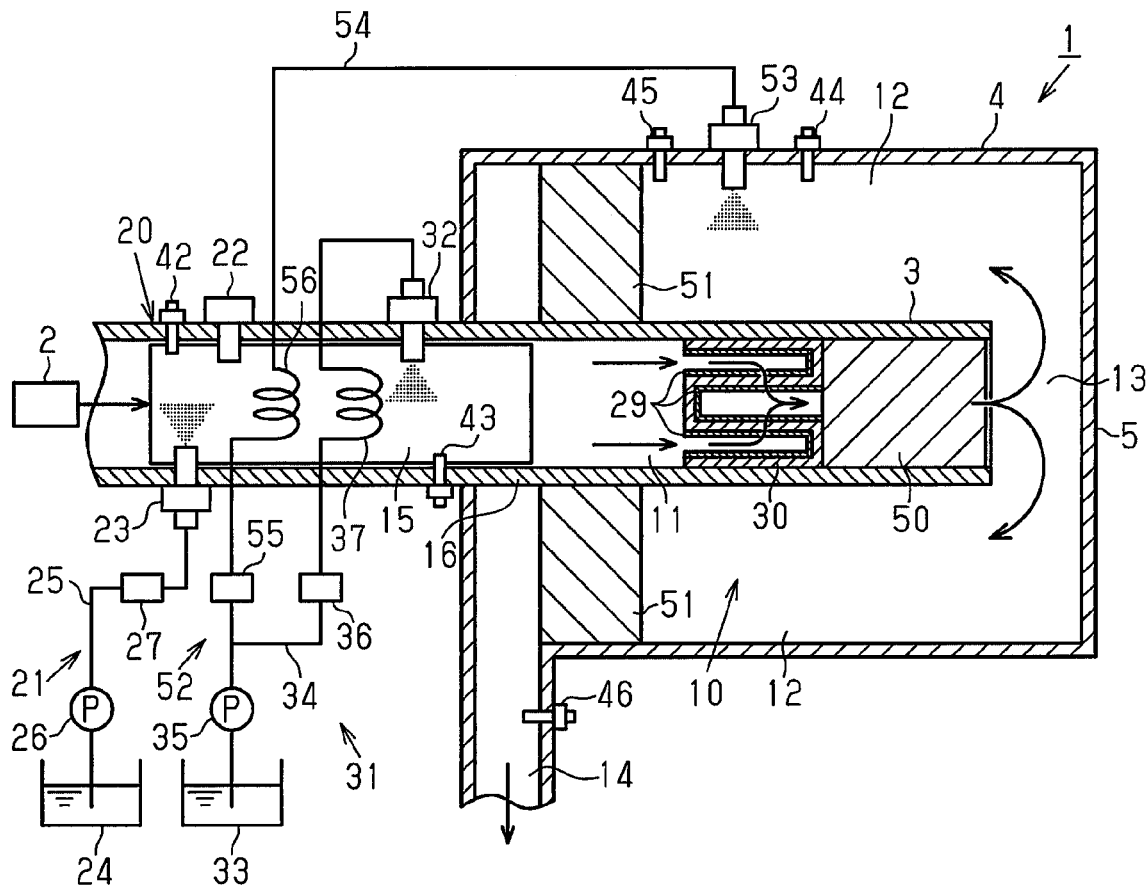
FIG. 1 illustrates the schematic structure of an exhaust purification system according to a first embodiment.
FIG. 2 illustrates the schematic configuration of a control device.

Referring to FIG. 1, an exhaust purification system 1 is supplied with exhaust gas from an engine 2 and purifies and emits the supplied exhaust gas. The exhaust purification system 1 has a double-tube structure including an inner tube 3 and an outer tube 4, which is arranged outside the inner tube 3. The outer tube 4 has a tube structure including a bottom. The inner tube 3 has two ends. In the two ends of the inner tube 3, a distal end is an end opposite to an end closer to the engine 2. The distal end of the inner tube 3 is inserted into the outer tube 4 and separated from a bottom surface 5 of the outer tube 4. This allows the inner space of the inner tube 3 to communicate with an outer space between the outer surface of the inner tube 3 and the inner surface of the outer tube 4. The entirety of the inner tube 3 and the outer tube 4 constitutes an exhaust passage 10.

Specifically, the exhaust passage 10 includes a first exhaust passage 11 defined by the inner surface of the inner tube 3, a second exhaust passage 12 defined by the outer surface of the inner tube 3 and the inner surface of the outer tube 4, and a third exhaust passage 13 defined by the bottom surface 5 of the outer tube 4 and the inner surface of the outer tube 4. The third exhaust passage 13 allows communication between the first exhaust passage 11 and the second exhaust passage 12. In addition, the exhaust passage 10 includes a fourth exhaust passage 14. The fourth exhaust passage 14 emits exhaust gas that has passed through the second exhaust passage 12. In the exhaust passage 10, exhaust gas from the engine 2 is supplied to the first exhaust passage 11, then turned back at the third exhaust passage 13, and supplied to the second exhaust passage 12, and finally emitted out of the fourth exhaust passage 14. In this manner, the exhaust passage 10 is configured so that the exhaust gas flow passage turns back at the third exhaust passage 13 and the second exhaust passage 12 is located outside the first exhaust passage 11. This lengthens the exhaust gas flow passage and reduces the size in the extension direction of the inner tube 3 and the outer tube 4.

The portion of the first exhaust passage 11 located closest to the engine 2 defines a combustion space 15 where fuel is burned by a burner 20. The combustion space 15 is surrounded by a combustion space defining wall 16, which is part of the inner tube 3. The burner 20 includes a fuel supplying unit 21 that supplies the combustion space 15 with fuel and an ignition plug 22 that ignites the fuel supplied to the combustion space 15. The burner 20 is operated when an upstream selective reduction catalyst 29 has a catalyst temperature that is lower than its activation temperature or when a downstream selective reduction catalyst 51, which is located downstream of the upstream selective reduction catalyst 29 in the exhaust flow direction, has a catalyst temperature that is lower than the activation temperature. The operation of the burner 20 heats the upstream selective reduction catalyst 29 and the downstream selective reduction catalyst 51 and heats urea water to an extent in which the urea water is hydrolyzed to ammonia.

In the fuel supplying unit 21, a fuel tank 24 and an injection nozzle 23 arranged in the combustion space defining wall 16 are connected by a fuel passage 25 such a pipe. A fuel pump 26 forces fuel of the fuel tank 24 into the injection nozzle 23 by pressure. The fuel passage 25 includes a fuel on/off valve 27 located between the injection nozzle 23 and the fuel pump 26. The fuel on/off valve 27 opens the fuel passage 25 to supply fuel to the injection nozzle 23 only when the burner 20 is operated. The ignition plug 22 is, for example, a spark plug or a glow plug. The ignition plug 22 is arranged in the combustion space defining wall 16 and ignites fuel injected from the injection nozzle 23. The fuel burns with oxygen that remains in exhaust gas and acts as an oxidizing agent. The injection nozzle 23 may be an injector in which the function of the fuel on/off valve 27 is incorporated.

The first exhaust passage 11 includes a diesel particulate filter (DPF) 30 located downstream of the combustion space 15. The DPF 30 captures particulate matter (PM) contained in exhaust gas. The DPF 30 is a wall flow filter that is made of, for example, ceramic or stainless steel having an excellent heat resistance and captures particulate matter contained in exhaust gas when the exhaust gas passes through the wall.

Particulate matter captured by the DPF 30 is burned by the flow of exhaust gas that rises in temperature by burning of the fuel in the burner 20.

The filter constituting the DPF 30 supports the upstream selective reduction catalyst 29 such as zeolite, alumina, and zirconia so that the DPF 30 functions as a selective reduction system. Zeolite includes copper zeolite, iron zeolite, silver zeolite, zinc zeolite, cobalt zeolite, and the like. When reducing NOx contained in exhaust, the upstream selective reduction catalyst 29 has an auxiliary role for the downstream selective reduction catalyst 51 arranged in the second exhaust passage 12, which will be described later. That is, as the amount of the selective reduction catalyst increases, the NOx reduction performance becomes higher. On the other hand, if selective reduction catalysts of the filter are arranged excessively, that is, if selective reduction catalysts are provided excessively thick, the flow of exhaust gas into the exhaust passage is limited. This increases the pressure loss of the filter. Thus, the upstream selective reduction catalyst 29 plays an auxiliary role in reduction by the downstream selective reduction catalyst 51. The upstream selective reduction catalyst 29 is heated by exhaust gas to the activation temperature or higher. The upstream selective reduction catalyst 29 is heated by the burner 20 to the activation temperature or higher when the temperature of the upstream selective reduction catalyst 29 is lower than the activation temperature during cold start or low-load operation.

Urea water is used as a reducing agent used for the upstream selective reduction catalyst 29, which is arranged at the DPF 30. Thus, a urea water supplying unit 31 that supplies urea water to the upstream side of the DPF 30 is arranged at the upstream side of the DPF 30 of the first exhaust passage 11, that is, in the combustion space 15. The urea water supplying unit 31 includes an upstream adding valve 32 that adds urea water or hydrolyzed ammonia serving as a reducing agent to exhaust gas from the combustion space 15. The upstream adding valve 32 is arranged in the combustion space defining wall 16 and adds urea water or ammonia in the flow direction of exhaust gas.

In the urea water supplying unit 31, a urea water tank 33 and the upstream adding valve 32 arranged in the combustion space defining wall 16 are connected by a connection passage 34 such as a pipe. A urea water pump 35 forces urea water in the urea water tank 33 into the upstream adding valve 32 by pressure. The connection passage 34 includes an on/off valve 36 located between the upstream adding valve 32 and the urea water pump 35. The on/off valve 36 opens the connection passage 34 to supply urea water to the upstream adding valve 32 and disconnects the connection passage 34 to stop supplying urea water to the upstream adding valve 32.

The connection passage 34, through which urea water is supplied to the upstream adding valve 32, has a portion that is located downstream of the on/off valve 36 and functions as an upstream heating section 37. The upstream heating section 37 heats urea water added to the selective reduction catalyst of the DPF 30. The upstream heating section 37 is located in the combustion space 15 of the first exhaust passage 11. The upstream heating section 37 is a passage where a pipe made of copper, stainless steel, or the like having a high thermal conductance is shaped in a coiled or zigzag manner to lengthen the flow passage in the combustion space 15. Thus, the upstream heating section 37 efficiently heats urea water. When fuel in the combustion space 15 is burned by the burner 20, the upstream heating section 37 heats urea water to an extent in which the urea water is hydrolyzed to ammonia. When the burner 20 is being operated, the upstream adding valve 32 adds heated urea water or ammonia to a part located upstream of the DPF 30.

Further, the first exhaust passage 11 includes an upstream NOx concentration sensor 42 and an upstream temperature sensor 43. The upstream NOx concentration sensor 42 detects the NOx concentration of exhaust gas flowing into the combustion space 15. The upstream temperature sensor 43 detects the temperature of exhaust gas flowing into the upstream selective reduction catalyst 29 of the DPF 30 as the catalyst temperature of the selective reduction catalyst.

The first exhaust passage 11 includes a NOx adsorbent 50 that adsorbs NOx contained in exhaust gas. The NOx adsorbent 50 is located downstream of the DPF 30 in the direction in which exhaust flows. The NOx adsorbent 50 is a filter that physically adsorbs NOx. The NOx adsorbent 50 is made of a material such as oxides of rare earth, alkali metal, and alkaline earth metal, and zeolite. The NOx adsorbent 50 emits NOx when heated to a predetermined temperature. For example, the NOx adsorbent 50 emits NOx at the temperature of, for example, approximately 150° C. to 250° C. NOx that has passed through the NOx adsorbent 50 and NOx emitted through a regeneration process are converted into nitrogen by the downstream selective reduction catalyst 51 arranged in the second exhaust passage 12, which is located at the downstream side. The NOx adsorbent 50 can physically adsorb NOx even at a temperature that is lower than the activation temperature at which the selective reduction catalyst is activated. Further, the NOx adsorbent 50 prevents NOx from being emitted into the atmosphere even during cold start or low-load operation at a temperature that is lower than the temperature at which the selective reduction catalyst is activated.

The exhaust gas from which particulate matter has been removed by the DPF 30 is turned back in the flow direction at the third exhaust passage 13 and then supplied to the second exhaust passage 12. The second exhaust passage 12 is located outside the first exhaust passage 11. The exhaust gas turned back at the third exhaust passage 13 flows into the second exhaust passage 12. The second exhaust passage 12 is defined by the space between the outer surface of the inner tube 3 and the inner surface of the outer tube 4. In particular, the outer side of the combustion space 15 serves as the space for the downstream selective reduction catalyst 51 that mainly functions for the auxiliary upstream selective reduction catalyst 29 of the DPF 30.

The downstream selective reduction catalyst 51 is a monolith catalyst and is formed by, for example, coating a cordierite honeycomb carrier with zeolite, vanadium-based material, zirconia-based material, and the like. Zeolite includes copper zeolite, iron zeolite, zinc zeolite, cobalt zeolite, and the like. Generally, the downstream selective reduction catalyst 51 is not activated and does not have a sufficient NOx purification performance when its temperature is lower than the activation temperature. The downstream selective reduction catalyst 51 is heated to the activation temperature or higher by exhaust gas. Further, the downstream selective reduction catalyst 51 is heated by the burner 20 to the activation temperature or higher when the temperature of the downstream selective reduction catalyst 51 is lower than the activation temperature during cold start or low-load operation. When the burner 20 is operated, the downstream selective reduction catalyst 51 is heated via the combustion space defining wall 16, which is part of the inner tube 3, or heated by exhaust gas that has been heated by the burner 20.

Again, urea water, for example, is used as a reducing agent for the downstream selective reduction catalyst 51. Thus, a urea water supplying unit 52 that supplies a reducing agent to the downstream selective reduction catalyst 51 is arranged upstream of the downstream selective reduction catalyst 51 of the second exhaust passage 12. The urea water supplying unit 52 includes a downstream adding valve 53 that adds urea water or hydrolyzed ammonia to exhaust gas from the third exhaust passage 13. The downstream adding valve 53 is arranged on the outer tube 4 constituting the second exhaust passage 12. The downstream adding valve 53 adds urea water or ammonia in the flow direction of exhaust gas.

The urea water supplying unit 52 shares some components with the urea water supplying unit 31. At the upstream side of the urea water pump 35, the urea water supplying unit 52 shares the components with the urea water supplying unit 31. The downstream side of the urea water pump 35 is connected to a downstream adding valve 53 by a connection passage 54 such as a pipe. The connection passage 54 includes an on/off valve 55 located between the downstream adding valve 53 and the urea water pump 35. The on/off valve 55 opens the connection passage 54 to supply urea water toward the downstream adding valve 53.

Part of the connection passage 54, through which urea water is supplied to the downstream adding valve 53, located downstream of the on/off valve 55 functions as a downstream heating section 56 that heats urea water added to the downstream selective reduction catalyst 51. In the same manner as the upstream heating section 37, the downstream heating section 56 is located in the combustion space 15 in the first exhaust passage 11. When fuel is burned by the burner 20 in the combustion space 15, the downstream heating section 56 heats urea water to an extent in which the urea water is hydrolyzed to ammonia. When the burner 20 is operated, the downstream adding valve 53 adds the heated urea water or hydrolyzed ammonia to a part located upstream of the downstream selective reduction catalyst 51.

Further, the second exhaust passage 12 includes a downstream NOx concentration sensor 44 and a downstream temperature sensor 45 that are located upstream of the downstream selective reduction catalyst 51. The downstream NOx concentration sensor 44 detects the NOx concentration of exhaust gas flowing into the downstream selective reduction catalyst 51. The downstream temperature sensor 45 detects the temperature of exhaust gas flowing into the downstream selective reduction catalyst 51 as a catalyst temperature of the downstream selective reduction catalyst 51. Further, the fourth exhaust passage 14 arranged at the second exhaust passage 12 and located downstream of the downstream selective reduction catalyst 51 includes an emission NOx concentration sensor 46 that finally detects the concentration of NOx contained in exhaust gas.

As shown in FIG. 2, the exhaust purification system 1 as above is controlled by a control device 47 configured by a microcomputer or the like. The control device 47 includes, for example, a ROM, RAM, and CPU. The control device 47 performs calculation using input values input from the various sensors 41, 42, 43, 44, 45, and 46 in accordance with control programs stored in the ROM and performs an ignition control on the ignition plug 22 of the burner 20, an on/off control on the on/off valves 36 and 55 of the urea water supplying units 31 and 52, a drive control on the fuel pump 26 and the urea water pump 35, and the like.

Figure 3:
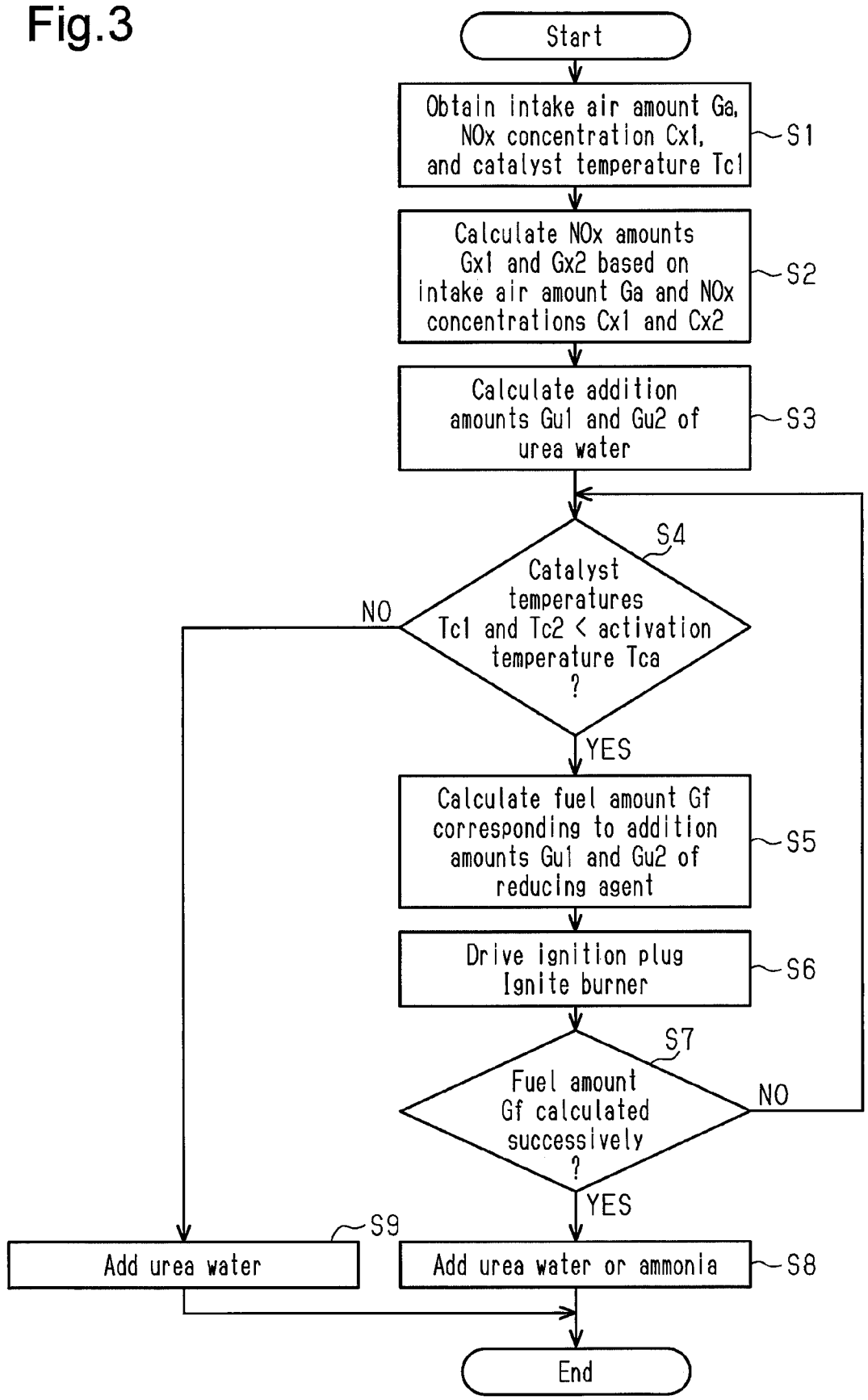
FIG. 3 is a flowchart illustrating one example of a process for adding urea water.

One example of a process for adding urea water will now be described with reference to FIG. 3. This process is started during cold start or low-load operation and repeatedly executed.

In step S1, the control device 47 obtains an intake air amount Ga from the intake air amount sensor 41, which is arranged in an intake passage of the engine 2, NOx concentrations Cx1, Cx2, and Cx3 from the NOx concentration sensors 42, 44, and 46, and catalyst temperatures Tc1 and Tc2 from the temperature sensors 43 and 45.

In step S2, the control device 47 calculates a NOx amount Gx1 of the first exhaust passage 11 based on the obtained intake air amount Ga, the NOx concentration Cx1 obtained from the upstream NOx concentration sensor 42 of the first exhaust passage 11, and the catalyst temperature Tc1 obtained from the upstream temperature sensor 43 of the first exhaust passage 11. In step S3, based on the NOx amount Gx1, the control device 47 calculates an addition amount Gu1 of urea water to be supplied to the upstream adding valve 32, from which urea water is supplied to the upstream selective reduction catalyst 29.

Further, the control device 47 calculates a NOx amount Gx2 of the second exhaust passage 12 based on the intake air amount Ga, the NOx concentration Cx2 obtained from the downstream NOx concentration sensor 44 of the second exhaust passage 12, and the catalyst temperature Tc2 obtained from the downstream temperature sensor 45 of the second exhaust passage 12. In step S3, based on the NOx amount Gx2, the control device 47 calculates an addition amount Gu2 of urea water to be supplied to the downstream adding valve 53, from which urea water is supplied to the downstream selective reduction catalyst 51.

In step S4, the control device 47 determines whether or not at least one of the catalyst temperature Tc1 obtained from the upstream temperature sensor 43 of the first exhaust passage 11 and the catalyst temperature Tc2 obtained from the downstream temperature sensor 45 of the second exhaust passage 12 in step S1 is lower than an activation temperature Tca. If at least one of the catalyst temperatures Tc1 and Tc2 is lower than the activation temperature Tca, the control device 47 proceeds to step S5, which is a process for heating urea water. If the catalyst temperatures Tc1 and Tc2 are not lower than the activation temperature Tca, that is, if the catalyst temperatures Tc1 and Tc2 are higher than or equal to the activation temperature Tca, the control device 47 proceeds to step S9, where urea water is not heated by the burner 20. By making such determinations, the control device 47 prevents situations in which urea water is supplied to the downstream selective reduction catalyst 51 and the upstream selective reduction catalyst 29 having a temperature that is lower than the activation temperature and urea contained in urea water is crystalized.

If at least one of the catalyst temperatures Tc1 and Tc2 is lower than the activation temperature Tca, in step S5, a fuel amount Gf is calculated according to the addition amounts Gu1 and Gu2 of urea water. The fuel amount Gf an amount of fuel used to operate the burner 20. In step S6, the control device 47 opens the fuel on/off valve 27 for fuel, drives the fuel pump 26, and injects fuel by the amount corresponding to the fuel amount Gf from the injection nozzle 23. Then, the control device 47 drives the ignition plug 22 to ignite the fuel.

In step S7, the control device 47 determines whether or not the fuel amount Gf is successively calculated. That is, the control device 47 determines whether or not the burner 20 continues to be operated by determining whether or not the fuel amount Gf is successively calculated. If the fuel amount Gf is successively calculated, the control device 47 proceeds to step S8. If the fuel amount Gf is not successively calculated, the control device 47 returns to step S4. If the fuel amount Gf is not successively calculated, the control device 47 repeats the processes (calculations) from step S4.

In step S8, the control device 47 opens the on/off valve 36 so that the upstream adding valve 32 adds urea water or ammonia generated by hydrolyzing urea water heated via the upstream heating section 37 to the upstream side of the upstream selective reduction catalyst 29 of the DPF 30. Further, the control device 47 opens the on/off valve 55 so that the downstream adding valve 53 adds urea water or ammonia generated by hydrolyzing urea water heated by the downstream heating section 56 to the upstream side of the downstream selective reduction catalyst 51.

By operating the burner 20 in this manner, urea water is heated so that hydrolysis is accelerated at the downstream heating section 56 and the upstream heating section 37 of the combustion space 15. Further, the upstream selective reduction catalyst 29 of the DPF 30 is heated to the activation temperature or higher, and the downstream selective reduction catalyst 51 of the second exhaust passage 12 is heated to the activation temperature or higher via the combustion space defining wall 16. This allows urea water to be easily converted into ammonia, or urea water is hydrolyzed to generate ammonia. Accordingly, even if the temperature of exhaust gas, the catalyst temperature Tc1 of the downstream selective reduction catalyst 51, or the catalyst temperature Tc2 of the upstream selective reduction catalyst 29 is lower than the activation temperature Tca, heated urea water or ammonia can be added. This prevents NOx from being emitted into the atmosphere during cold start or low-load operation.

If the control device 47 determines that the catalyst temperatures Tc1 and Tc2 are already higher than or equal to the activation temperature Tca in step S4, without operating the burner 20, the control device 47 uses the adding valves 32 and 53 to add urea water that is not heated by the burner 20 to the upstream selective reduction catalyst 29 and the downstream selective reduction catalyst 51 in step S9. In such a case, the downstream selective reduction catalyst 51 and the upstream selective reduction catalyst 29 has already been sufficiently heated to the activation temperature or higher. Thus, hydrolysis proceeds just by adding urea water without operating the burner 20, and ammonia is supplied to the upstream selective reduction catalyst 29 and the downstream selective reduction catalyst 51.

NOx of exhaust gas transmitted through the upstream selective reduction catalyst 29 or the DPF 30 is physically adsorbed by the NOx adsorbent 50. The NOx adsorbent 50 adsorbs NOx even if the catalyst temperatures Tc1 and Tc2 are lower than the activation temperature Tca. This prevents NOx from being emitted into the atmosphere even during cold start or low-load operation at a temperature lower than the activation temperature at which the selective reduction catalyst is activated. The NOx adsorbent 50 adsorbs a limited amount of NOx. The control device 47 manages the adsorption amount of NOx for the NOx adsorbent 50, which is located downstream of the DPF 30 in the exhaust flow direction. If the adsorption amount becomes a threshold value that is close to a performance limit value, the control device 47 starts a process for regenerating the NOx adsorbent 50.

Figure 4:
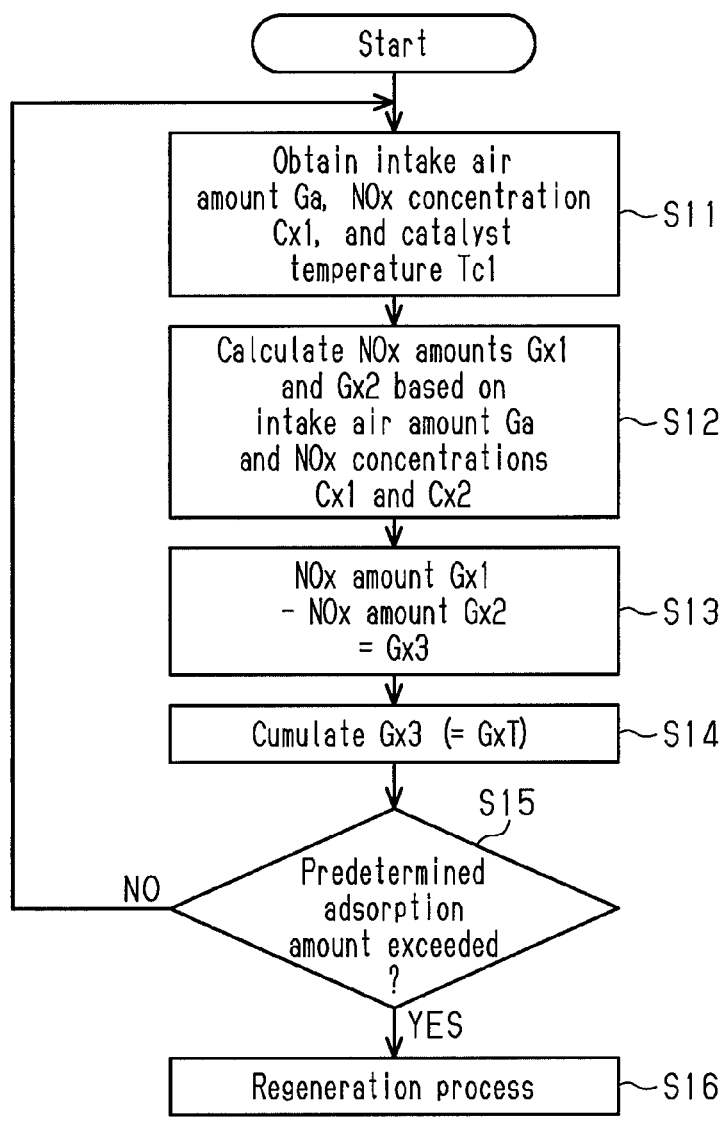
FIG. 4 is a flowchart illustrating one example of a process for calculating the amount of NOx adsorbed by a NOx adsorbent.

More specifically, as shown in FIG. 4, in step S11 and step S12, in the same manner as step S1 and step S2, the control device 47 obtains the intake air amount Ga from the intake air amount sensor 41, the NOx concentrations Cx1 and Cx2 from the NOx concentration sensors 42 and 44, and the catalyst temperatures Tc1 and Tc2 from the temperature sensors 43 and 45. The control device 47 calculates the NOx amount Gx1 of the first exhaust passage 11 and the NOx amount Gx2 of the second exhaust passage 12 based on the obtained intake air amount Ga, the NOx concentrations Cx1 and Cx2 obtained from the NOx concentration sensors 42 and 44, and the catalyst temperatures Tc1 and Tc2 obtained from the temperature sensors 43 and 45.

The NOx amount Gx1 of the first exhaust passage 11, which is the NOx amount Gx1 of the combustion space 15, is the NOx amount of exhaust gas supplied from the engine 2 prior to the purification process performed by the exhaust purification system 1. Further, the NOx amount Gx2 of the second exhaust passage 12 is the amount of NOx after passing through the upstream selective reduction catalyst 29 and the NOx adsorbent 50.

In step S13, the control device 47 calculates a NOx amount Gx3 adsorbed to the NOx adsorbent 50 by performing a process for subtracting the NOx amount Gx2 after passing through the NOx adsorbent 50 from the NOx amount Gx1 prior to the purification process. In the calculation of the NOx amount Gx3, if the NOx amount processed at the upstream selective reduction catalyst 29 is taken into account, the NOx amount processed at the upstream selective reduction catalyst 29 and the NOx amount Gx2 are subtracted from the NOx amount Gx1. The NOx amount processed at the upstream selective reduction catalyst 29 can be calculated by, for example, referring to a table based on the catalyst temperature Tc1 from the upstream temperature sensor 43 and the like.

In step S14, the control device 47 calculates a present cumulative value GxT by cumulating the present NOx amount Gx3 to the cumulated value of the previous one and the ones before the previous one. In step S15, the control device 47 determines whether or not the present cumulative value GxT exceeds a predetermined adsorption amount and repeats the processes from step S11 to step S14 until the present cumulative value GxT exceeds the predetermined adsorption amount. If the control device 47 determines that the present cumulative value GxT exceeds the predetermined adsorption amount, the control device 47 proceeds to step S16. In step S16, the control device 47 operates the burner 20, heats the NOx adsorbent 50 via the DPF 30, and performs a regeneration process for emitting the adsorbed NOx from the NOx adsorbent 50. The emitted NOx is processed by the downstream selective reduction catalyst 51.

Figure 5:
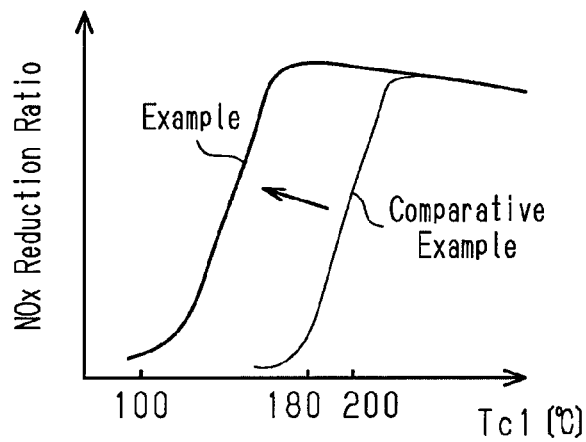
FIG. 5 is a graph illustrating one example of the relationship between a catalyst temperature and a NOx reduction ratio.

FIG. 5 is a graph illustrating one example of the relationship between the catalyst temperature and the NOx reduction ratio and is a graph illustrating the result of an experiment conducted on the NOx reduction ratio. In FIG. 5, the NOx reduction ratio of the example is a value obtained by the exhaust purification system 1, and the NOx reduction ratio of the comparative example is obtained by an exhaust purification system in which the heating sections 37 and 56 and the NOx adsorbent 50 are omitted from the exhaust purification system 1. As shown in FIG. 5, in the comparative example, the NOx reduction ratio is significantly low in the range of 100° C. to 180° C., which is a temperature range of the catalyst temperature during cold start or low-load operation. In the example, it is acknowledged that NOx is reduced when the catalyst temperature is in the range of 100° C. to 180° C. Further, in the example, it is acknowledged that the NOx reduction ratio is higher than that of the comparative example at each temperature that is lower than or equal to 200° C.

The exhaust purification system 1 of the first embodiment has the advantages described below.

(1) In the exhaust purification system 1, operation of the burner 20 heats urea water so that the urea water is easily converted into ammonia. Thus, even when the catalyst temperatures Tc1 and Tc2 of the selective reduction catalysts 29 and 51 are lower than the activation temperature Tca, urea water or hydrolyzed ammonia heated by the heating sections 37 and 56 of the combustion space 15 can be supplied to exhaust gas. As a result, the reduction amount of NOx increases.

(2) In the exhaust purification system 1, even when the catalyst temperatures Tc1 and Tc2 of the NOx adsorbent 50 located upstream of the downstream selective reduction catalyst 51 are lower than the activation temperature Tca, NOx is adsorbed. This prevents NOx from being emitted into the atmosphere even during cold start or low-load operation at a temperature that is lower than the activation temperature at which the selective reduction catalyst is activated.

(3) The DPF 30 is arranged downstream of the burner 20. Thus, the DPF 30 captures particulate matter that is generated by operating the burner 20. This limits the increase in the emission amount of particulate matter resulting from the operation of the burner 20.

(4) The upstream selective reduction catalyst 29 is arranged integrally with the DPF 30. Thus, NOx is reduced at the upstream side of the NOx adsorbent 50 and the downstream selective reduction catalyst 51, and the burden on the NOx adsorbent 50 and the downstream selective reduction catalyst 51 is reduced.

(5) When the burner 20 is operated in order to heat urea water at the heating sections 37 and 56, the upstream selective reduction catalyst 29 is simultaneously heated. Further, the downstream selective reduction catalyst 51 is simultaneously heated via the combustion space defining wall 16. This shortens the time for the catalyst temperatures Tc1 and Tc2 of the selective reduction catalysts 29 and 51 to reach the activation temperature Tca.

(6) The burner 20 is operated only when the catalyst temperatures Tc1 and Tc2 of the selective reduction catalysts 29 and 51 are lower than the activation temperature Tca. This minimizes the consumption of fuel required to heat urea water with the burner 20.

(7) When the catalyst temperatures Tc1 and Tc2 are lower than the activation temperature Tca, ammonia supplied to the selective reduction catalysts 29 and 51 is retained on the selective reduction catalysts 29 and 51. When the catalyst temperatures Tc1 and Tc2 reach the activation temperature Tca, immediate conversion into nitrogen can be performed with the retained ammonia.

[Second Embodiment]

An exhaust purification system according to a second embodiment will now be described with reference to FIG. 6. The exhaust purification system according to the second embodiment is primarily configured in the same way as the exhaust purification system according to the first embodiment. Thus, in the second embodiment, components different from those of the first embodiment will be described in detail, and like or same reference numerals are given to those components that are the same as the corresponding components of the first embodiment. Such components will not be described in detail.

Figure 6:
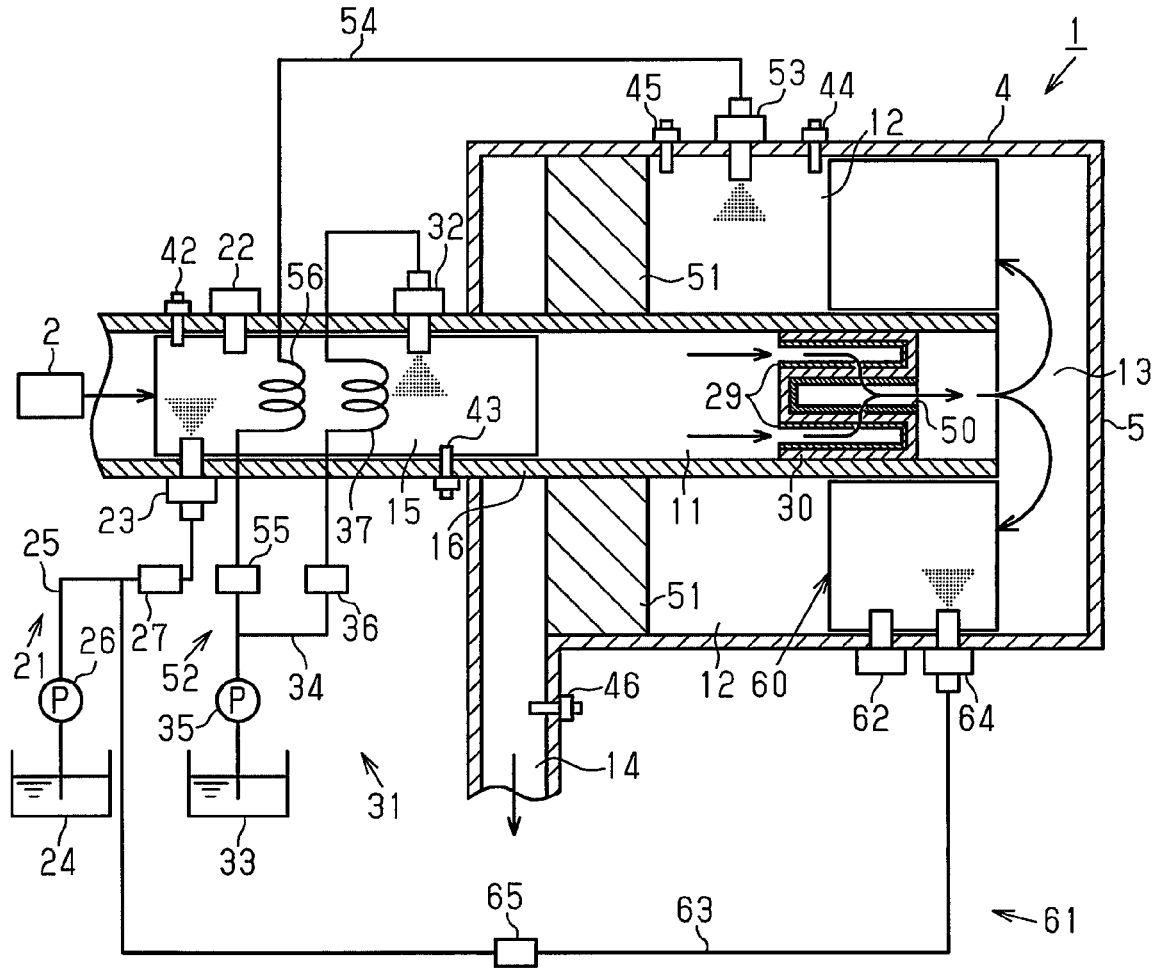
FIG. 6 illustrates the schematic structure of an exhaust purification system according to a second embodiment.

As shown in FIG. 6, the exhaust purification system includes a downstream burner 60 located outside the NOx adsorbent 50. The downstream burner 60 includes a fuel supplying unit 61 that supplies fuel to the second exhaust passage 12 and an ignition plug 62 that ignites the fuel supplied to the second exhaust passage 12. The fuel supplying unit 61 shares some components with the fuel supplying unit 21. That is, the fuel supplying unit 61 shares the components located upstream of the fuel pump 26 with the fuel supplying unit 21. A connection passage 63 such as a pipe located downstream of the fuel pump 26 is connected to an injection nozzle 64. The connection passage 63 includes a fuel on/off valve 65 located between the injection nozzle 64 and the fuel pump 26. The fuel on/off valve 65 opens the connection passage 63 to supply fuel to the injection nozzle 64 and disconnects the connection passage 63 to stop supplying fuel to the injection nozzle 64. The ignition plug 62 is arranged on a portion of the second exhaust passage 12 of the inner tube 3. The ignition plug 62 ignites fuel injected from the injection nozzle 64. The fuel burns with oxygen that remains in exhaust gas and acts as an oxidizing agent.

Further, as shown in FIG. 6, in addition to the integration of the DPF 30 with the upstream selective reduction catalyst 29, the NOx adsorbent 50 is further integrated with the DPF 30 and the upstream selective reduction catalyst 29. This simplifies the structure and reduces the number of components. In this case, the upstream selective reduction catalyst 29 is supported on the upstream surface of the DPF 30, and the NOx adsorbent 50 is supported on the downstream surface of the DPF 30. The DPF 30 is formed so that the upstream selective reduction catalyst 29 and the NOx adsorbent 50 are not overlapped with each other. This prevents the increase in the pressure loss of the filter.

The exhaust purification system of the second embodiment has the following advantages in addition to advantages similar to advantages (1) to (7) of the first embodiment.

(8) The downstream burner 60 is operated when the catalyst temperature of the downstream selective reduction catalyst 51 located downstream of the second exhaust passage 12 is lower than the activation temperature. This heats the downstream selective reduction catalyst 51 and heats urea water added from the downstream adding valve 53 to convert the urea water into ammonia through hydrolysis. This further shortens the time for the catalyst temperature Tc2 of the downstream selective reduction catalyst 51 to reach the activation temperature Tca.

(9) When regenerating the downstream selective reduction catalyst 51, the downstream burner 60 heats the NOx adsorbent 50 via the inner tube 3. This emits NOx adsorbed to the NOx adsorbent 50 to the downstream side. The emitted NOx can be eliminated by the downstream selective reduction catalyst 51.

(10) The upstream selective reduction catalyst 29 and the NOx adsorbent 50 are arranged integrally with the DPF 30. This reduces the number of components and the size. Even when the upstream selective reduction catalyst 29 and the NOx adsorbent 50 are arranged integrally with the DPF 30, the upstream selective reduction catalyst 29 and the NOx adsorbent 50 are arranged so as not to be overlapped. This prevents the pressure loss of the filter.

The first and second embodiments may be modified as described below.

As long as the NOx adsorbent 50 is located downstream of the DPF 30 in the exhaust flow direction, the position of the NOx adsorbent 50 is not particularly limited. For example, the NOx adsorbent 50 may be located immediately before the downstream selective reduction catalyst 51 in the second exhaust passage 12.

The exhaust passage 10 is not limited to the double-tube structure formed by the inner tube 3 and the outer tube 4. For example, the exhaust passage 10 may be formed by a single tube body so that one end of the exhaust passage 10 is connected to the engine 2 and the burner 20, the DPF 30, the NOx adsorbent 50, and the downstream selective reduction catalyst 51 are sequentially arranged from the upstream side in the exhaust flow direction. The tube body forming the exhaust passage 10 may be straight or at least partially curved.

In the above description, the upstream selective reduction catalyst 29 is supported by the DPF 30. As long as the NOx adsorbent 50 and the downstream selective reduction catalyst 51 sufficiently eliminate NOx, the upstream selective reduction catalyst 29 may be omitted from the exhaust purification system.

The NOx adsorbent 50 does not have to physically adsorb the NOx and may use a diesel particulate NOx reduction (DPNR) catalyst. In this case, particulate matter and NOx can be simultaneously reduced in addition to THC and CO, and the DPF 30 may be omitted. The NOx adsorbent 50 may be a combination of a structure that physically adsorbs NOx and a structure using a DPNR catalyst.

A diesel oxidation catalyst (DOC) may be arranged upstream of the DPF 30. Further, an ammonia oxidation catalyst that oxides ammonia may be arranged downstream of the downstream selective reduction catalyst 51.

The burner 20 may be operated when the catalyst temperatures Tc1 and Tc2 reach the activation temperature Tca. In this case, it is preferred that the fuel amount Gf be controlled in accordance with the addition amounts Gu1 and Gu2 of urea water.

Regardless of the addition amounts Gu1 and Gu2 of urea water, the fuel amount Gf may be fixed. In this case, urea water is easily converted into ammonia.

The fuel amount Gf may be adjusted based on a detection value of a sensor that detects the temperature of urea water in the urea water tank 33. Such a structure further reduces the amount of fuel that is consumed by operating the burner 20.

The heating sections 37 and 56 only have to be located in the combustion space 15 and do not have to be shaped in a coil or spiral manner.

In the urea water supplying units 31 and 52, an insulator may be arranged between the heating sections 37 and 56 and the adding valves 32 and 53 so as to cover a pipe. This prevents heated urea water from decreasing in temperature.

The burners 20 and 60 may include an air supplying unit that supplies air at the upstream side of the injection nozzles 23 and 64 so that air-fuel mixture of fuel and air is generated. Alternatively, the burners 20 and 60 may be configured to supply premixture in which fuel and air are premixed.

In the exhaust purification system 1 of FIG. 1, as shown in FIG. 6, a filter in which the DPF 30, the upstream selective reduction catalyst 29, and the NOx adsorbent 50 are integrated may be used. Further, in the exhaust purification system 1 of FIG. 6, the DPF 30 and the NOx adsorbent 50 integrated with the upstream selective reduction catalyst 29 may be separated.

What is claimed is:

1. An exhaust purification system comprising:
   an exhaust passage through which exhaust gas flows;
   a burner arranged in the exhaust passage, wherein a combustion space for fuel in the burner is a part inside the exhaust passage;
   a NOx adsorbent located downstream of the combustion space in the exhaust passage, wherein the NOx adsorbent adsorbs nitrogen oxide contained in the exhaust gas;
   a selective reduction catalyst located downstream of the NOx adsorbent in the exhaust passage;
   an adding valve located between the selective reduction catalyst and the combustion space in the exhaust passage; and
   a connection passage connected to the adding valve, wherein urea water flows through the connection passage toward the adding valve, and a part of the connection passage runs through the combustion space, wherein
   the exhaust passage includes a combustion space defining wall, which defines the combustion space, wherein the combustion space defining wall separates a space where the selective reduction catalyst is located and the combustion space from each other, and
   the fuel is burned by the burner so that the selective reduction catalyst is heated via the combustion space defining wall.

2. The exhaust purification system according to claim 1, further comprising a diesel particulate filter (DPF) located between the burner and the NOx adsorbent in the exhaust passage.

3. The exhaust purification system according to claim 2, wherein
   the selective reduction catalyst is a downstream selective reduction catalyst,
   the adding valve is a downstream adding valve,
   the connection passage is a downstream connection passage for the downstream adding valve,
   an upstream selective reduction catalyst is integrated with the DPF, wherein the upstream selective reduction catalyst is located upstream of the downstream selective reduction catalyst in the exhaust passage,
   the exhaust purification system further comprising:
   an upstream adding valve located upstream of the upstream selective reduction catalyst in the exhaust passage; and
   an upstream connection passage for the upstream adding valve connected to the upstream adding valve, wherein urea water flows through the connection passage toward the upstream adding valve, and a part of the upstream connection passage runs through the combustion space.

4. The exhaust purification system according to claim 3, wherein
   the upstream selective reduction catalyst is arranged integrally with an upstream surface of the DPF, and
   the NOx adsorbent is arranged integrally with a downstream surface of the DPF.

5. The exhaust purification system according to claim 1, further comprising a control device that obtains a catalyst temperature of the selective reduction catalyst and operates the burner when the obtained catalyst temperature is lower than an activation temperature of the selective reduction catalyst.

6. The exhaust purification system according to claim 5, wherein
   the burner is an upstream burner located upstream of the NOx adsorbent in the exhaust passage,
   the exhaust purification system further comprises a downstream burner located between the NOx adsorbent and the selective reduction catalyst in the exhaust passage, and
   the control device operates the downstream burner when the obtained catalyst temperature is lower than the activation temperature of the selective reduction catalyst.

* * * * *